E. H. HUMPHREY.
CASTER.
APPLICATION FILED APR. 8, 1909.
938,867.
Patented Nov. 2, 1909.
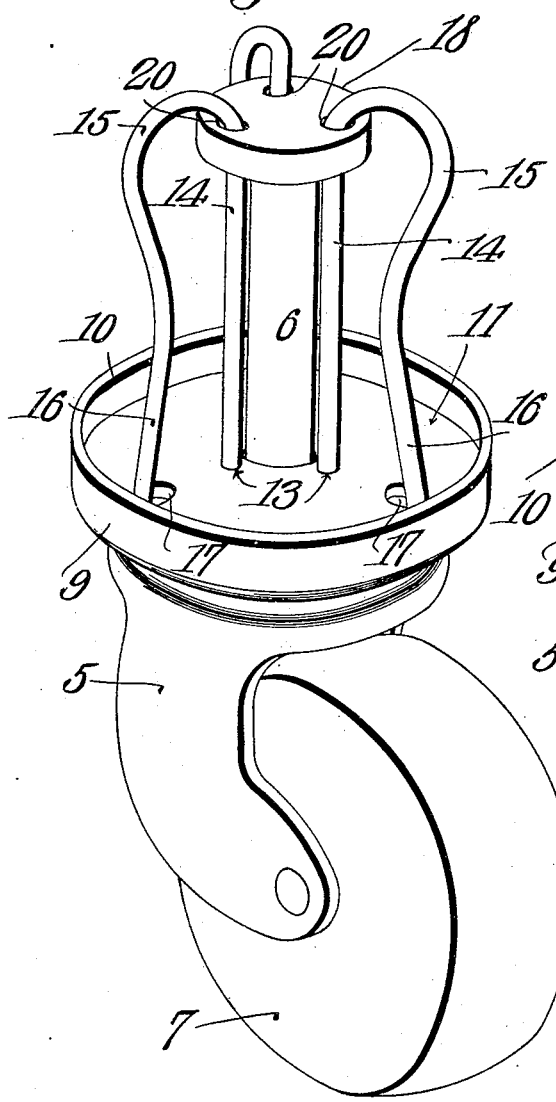
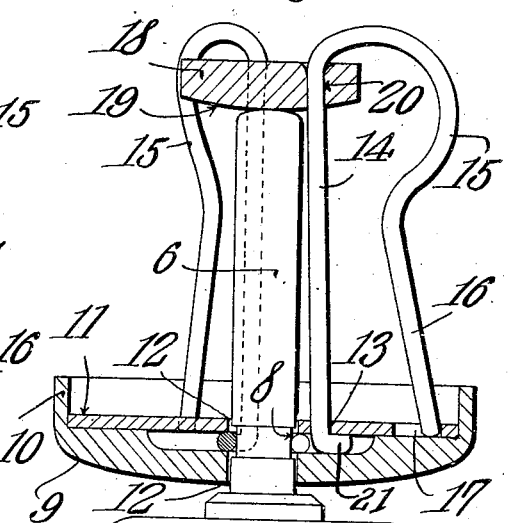
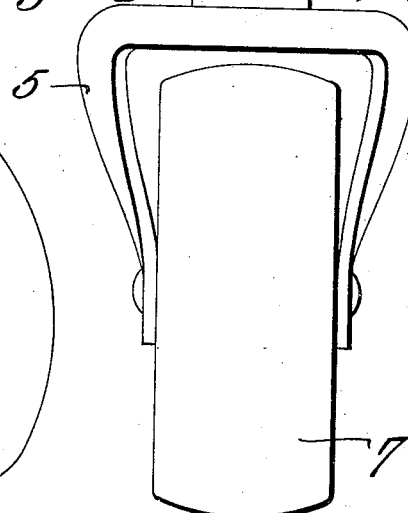
Witnesses
Inventor
Edwin H. Humphrey
By C. A. Snow & Co.
Attorneys

UNITED STATES PATENT OFFICE.

EDWIN H. HUMPHREY, OF CORRY, PENNSYLVANIA, ASSIGNOR, BY DIRECT AND MESNE ASSIGNMENTS, TO CORRY CASTOR CO., OF CORRY, PENNSYLVANIA.

CASTER.

938,867.      Specification of Letters Patent.      Patented Nov. 2, 1909.

Application filed April 8, 1909. Serial No. 488,631.

*To all whom it may concern:*

Be it known that I, EDWIN H. HUMPHREY, a citizen of the United States, residing at Corry in the county of Erie and State of Pennsylvania, have invented a new and useful Caster, of which the following is a specification.

It is the object of the present invention to provide an improved construction of furniture caster and one aim of the invention is to provide a novel and highly efficient anchoring means for a caster of the class described, the anchoring means being so constructed and arranged as to bear firmly against the wall of a socket into which the caster is fitted whereby accidental displacement of the caster will be obviated.

Another object of the present invention is to provide, in a caster, a bearing so constructed as to render the caster readily responsive to any change in direction of movement of a piece of furniture which it supports, and in this connection it is proposed to secure a very sensitive or responsive bearing construction without the employment of ball or similar bearings.

A still further object of the invention is to provide a novel means for locking the caster in its socket.

In the accompanying drawings, Figure 1 is a perspective view of a caster constructed in accordance with the present invention, and Fig. 2 is a vertical sectional view therethrough.

In the drawings, the caster yoke is indicated by the numeral 5, the shank by the numeral 6 and the caster wheel by the numeral 7, these elements being of the ordinary construction with the exception of the caster shank 6 which is formed, for a purpose to be presently explained, with a circumscribing groove 8.

The socket member of the caster comprises a base which consists of a cap plate 9 formed with an annular upstanding flange 10 and a plate 11 which is forced into place within the cap member 9 as is clearly shown in the sectional view of the drawings and seats, preferably, below the upper edge of the flange 10 of the cap member. As is shown in the drawings, the cap member 9 and plate 11 are both formed with openings, indicated by the numeral 12, for the passage of the shank 6 of the caster and extending in a series around this opening 12 in the plate 11, are other openings 13 each of which receives one end of an anchoring member which is here shown as in the form of a length of resilient wire indicated by the numeral 14, headed at its end which is inserted through the opening 13 and projecting upwardly from the said plate 11 in parallelism to the shank 6 of the caster. From their upwardly extending portions 14, the anchoring members are bent to extend substantially at right angles radially and are then bent downwardly and inwardly as at 15 and finally downwardly and outwardly radially as at 16 with their lower ends seating in radial slots 17 formed in the plate 11, one outwardly radially of and with respect to each opening 13. The anchoring members just described are resilient as will be readily understood and while their upstanding portions 14 are substantially relatively fixed, their portions 15 and 16 tend at all times to spring away from their portions 14 and are only limited in such movement by engaging each at one end of its respective slot 17 in the plate 11, it being understood that when the socket member is inserted into a recess formed in an article of furniture to be supported by the caster, these anchoring members will have their portions 15 and 16 sprung inwardly toward their upstanding portions 14 and will hence bind frictionally against the wall of the recess into which they are inserted.

The bearing member of the caster is in the form of a head 18 formed with a convex under side 19 and with openings 20 through which pass the upper ends of the upstanding portions 14 of the anchoring members of the caster socket member, the radially bent portion of these anchoring members extending radially across the upper face of the said head 18. It will be understood of course that the engagement of the upstanding portions 14 of the anchoring members through the openings 20 in the head 18 will serve to properly relatively space these members and to hold their said portions 14 substantially relatively fixed or rigid and that on the other hand the said head 18 is firmly supported by the members, their portions 14 being headed at their lower ends as indicated by the numeral 21 and the heads being received between the plate 11 and the cap 9 of the base of the socket member of the caster, the said head being in this manner supported against upward movement.

As heretofore stated, the under side of the head is convexed and it is preferable that the upper end of the shank 6 of the caster be formed also convex or round and the said end of the caster shank has a bearing against the under side of the head 18 axially thereof and owing to the convexity of the said upper end of the shank and the under side of the head, an extremely sensitive and responsive bearing is in this manner provided as will be readily understood.

As heretofore stated, the shank 6 of the caster is formed with a circumscribing groove 8 and engaging in this groove and encircling the shank is an open resilient locking ring 22 which is confined between the plate 11 and cap 9 of the socket member and is held concentric with respect to the edge of the opening 12 in the said plate 11 and cap 9, by the heads 21 at the lower ends of the upstanding portions 14 of the anchoring members. It will be observed from an inspection of Fig. 2 of the drawings that this groove 8 is of considerably greater width than the diameter of the locking ring 22 and owing to this fact, the caster shank 6 may have a bearing against the under side of the head 19 without exerting any strain whatsoever upon the ring 22, this ring serving merely to prevent dropping of the caster shank through the openings 12 should the article of furniture which the caster is to support, be lifted.

From the foregoing description of the invention it will be seen that I have provided a very substantial form of caster which is readily responsive to any change in direction of movement of a piece of furniture which it supports and that the bearing which renders the caster responsive to changes in direction of movement is in no way expensive to manufacture, it involving no ball or similar bearings whatsoever. It will further be understood that the anchoring members are so constructed and arranged as to positively insure a firm seating of the socket member of the caster in its receiving recess in the article of furniture which the caster is to support and it will further be appreciated that the several elements of the socket member of the caster may be quickly and readily assembled and are not expensive to manufacture.

What is claimed is:—

1. In a caster, a socket member comprising a base, a plurality of resilient anchoring members carried by the base, the said base being provided with a shank receiving opening, the said anchoring members being disposed radially about said opening, and a bearing head supported by the said members and located axially in alinement with the shank receiving opening.

2. In a caster, a socket member comprising a base, a plurality of anchoring members carried by the base, each of said members comprising a relatively fixed portion and a yieldable portion, the latter portion of each of the members working in a slot in the base, and a bearing head supported by the relatively fixed portion of the anchoring members.

3. In a caster, a socket member comprising a base, anchoring members secured each at one end to the base and projecting upwardly therefrom and thence bent back upon itself with its other end seating in a slot in the base, and a bearing head supported by the upstanding portion of the said anchoring members.

4. In a caster, a socket member comprising a base, resilient anchoring members carried by the base, a bearing head supported by the said members, and a caster shank fitted through the base and bearing at its upper end against the under side of said head.

5. In a caster, a socket member comprising a base, a plurality of anchoring members carried by the base, a head supported by the members and holding the members in proper relative position, and a caster-shank fitted through the base and bearing at its upper end against the under side of said head.

In testimony that I claim the foregoing as my own, I have hereto affixed my signature in the presence of two witnesses.

EDWIN H. HUMPHREY.

Witnesses:
 E. HUME TALBERT,
 E. DANIELS.